(12) United States Patent
Nagashima

(10) Patent No.: US 6,178,214 B1
(45) Date of Patent: Jan. 23, 2001

(54) SYNCHRONIZING SYSTEM CAPABLE OF CERTAINLY EXECUTING SYNCHRONIZING OPERATION

(75) Inventor: Katsuya Nagashima, Saitama (JP)

(73) Assignee: NEC Corporation, Tokyo (JP)

( * ) Notice: Under 35 U.S.C. 154(b), the term of this patent shall be extended for 0 days.

(21) Appl. No.: 09/199,058

(22) Filed: Nov. 24, 1998

(30) Foreign Application Priority Data

Nov. 28, 1997 (JP) .................................................. 9-341949

(51) Int. Cl.[7] .................................................. H04L 7/06
(52) U.S. Cl. ........................ 375/364; 370/503; 327/155
(58) Field of Search ................................. 375/364, 354, 375/362; 370/347, 350, 503, FOR 167; 327/141, 155, 161

(56) References Cited

U.S. PATENT DOCUMENTS

| | | | |
|---|---|---|---|
| 5,570,370 | * 10/1996 | Lin | 370/347 |
| 5,666,366 | * 9/1997 | Malek | 370/505 |
| 5,729,543 | * 3/1998 | Weigand et al. | 370/347 |
| 5,768,281 | * 6/1998 | Takano | 370/503 |
| 5,774,495 | * 6/1998 | Noda | 375/222 |
| 5,872,774 | * 2/1999 | Wheatley, III et al. | 370/335 |
| 5,896,561 | * 4/1999 | Schrader et al. | 455/67.1 |

FOREIGN PATENT DOCUMENTS

| | | |
|---|---|---|
| 6-29910 | 2/1994 | (JP) . |
| 8-8810 | 1/1996 | (JP) . |

\* cited by examiner

*Primary Examiner*—Stephen Chin
*Assistant Examiner*—Lenny Jiang
(74) *Attorney, Agent, or Firm*—Young & Thompson

(57) ABSTRACT

In a synchronizing system, a CRC bit end judging circuit judges an end of a CRC bit of the demodulated signal from the demodulating circuit to produce a CRC bit end signal. A RSSI detecting circuit detects a RSSI level of the received signal to produce a RSSI level signal. An edge detecting circuit compares the RSSI level with a predetermined threshold level to produce a level compared result signal when the RSSI level is greater than the predetermined threshold level. The edge detecting circuit masks, in a predetermined time interval, the level compared result signal in response to both of the CRC bit end signal and the level compared result signal. The edge detecting circuit produces a trigger signal in response to the level compared result signal after the predetermined time interval. A bit synchronous circuit produces, in response to the trigger signal, the bit synchronous signal. A bit synchronous correcting circuit corrects the bit synchronous signal to produce and supply a bit synchronous correct signal to the demodulating circuit.

12 Claims, 7 Drawing Sheets

SYNCHRONIZING SYSTEM CAPABLE OF CERTAINLY EXECUTING SYNCHRONIZING OPERATION

BACKGROUND OF THE INVENTION

This invention relates to a synchronizing system which synchronizes a demodulated signal with a received signal and which is used in a radio base station of the TDMA-TDD type.

DESCRIPTION OF THE PRIOR ART

Generally, in the synchronizing system of the TDMA-TDD type, the synchronizing system of the radio base station receives, as a received signal, a transmitting signal (control channel signal) from the other radio base station to judge timing of the received signal and to synchronize a demodulated signal with the received signal. In the synchronizing system of the TDMA-TDD type, timing of transmitting signals are random and each of the received signals is a burst signal. The radio base station waits so as to receive, in series, the transmitting signals. The synchronizing system of the radio base station detects an edge of a RSSI (Received Signal Strength Intensity) level to produce an edge detecting signal when the RSSI level is greater than a predetermined threshold level. The synchronizing system of the radio base station starts, in response to the edge detecting signal, to operate as a bit synchronous circuit or an AFC circuit.

A conventional synchronizing system is disclosed in Japanese Unexamined Patent Prepublication (koukai) No.29910/1994. The conventional synchronizing system comprises a received frame separating circuit, a timing correcting circuit, and a transmitting frame generating circuit. The received frame separating circuit detects timing of a received signal to produce and supply a timing value signal to the timing correcting circuit. The timing correcting circuit corrects the timing value signal to produce and supply a corrected timing value signal to the transmitting frame generating circuit. The transmitting frame generating circuit generates, in response to the corrected timing value signal, a transmitting signal as a demodulated signal. Thereby, the conventional synchronizing system synchronizes the transmitting signal with the received signal.

In communication of the TDMA-TDD type, transmitting signals of each of the radio base stations are, apart, transmitted so that the transmitting signals are not overlapped. However, the radio base station is supplied with the radio signals which are overlapped or serial due to physical distance difference in air transfer or multiple fading. In this event, the RSSI level of the received signal which is received by the radio base station is not smaller than the predetermined level. As a result, the radio base station does not detect the edge of the RSSI level. Therefore, the radio base station does not discriminate head bits of received signals after the second received signal when the radio base station is supplied with the radio signals which are overlapped or serial. As a result, receiving characteristic of the received signals after the second received signal is deteriorated and operational characteristic of the bit synchronous circuit or the AFC circuit receives bad influence.

Also, modulation ripple is caused in the RSSI level due to modulation of received radio signal and change of the RSSI level is caused by change of an envelope due to fading. As a result, a slit (instant cutting) of a waveform of the RSSI level signal is caused when the RSSI level is near to the predetermined threshold level. In this event, malfunction of the bit synchronous circuit or the AFC circuit is caused by the slit of the waveform of the RSSI level signal.

SUMMARY OF THE INVENTION

It is therefore an object of this invention to provide a synchronizing system which is capable of certainly executing synchronizing operation even when the synchronizing system is supplied with radio signals which are overlapped or serial.

It is another object of this invention to provide a synchronizing system which is capable of preventing malfunction due to change of RSSI level.

Other objects of this invention will become clear as the description proceeds.

According to a first aspect of this invention, there is provided a synchronizing system comprising:

demodulating means receiving a received signal for demodulating the received signal to produce a demodulated signal having a CRC bit;

CRC bit end judging means connected to the demodulating means for judging an end of the CRC bit of the demodulated signal to produce a CRC bit end signal;

received signal level detecting means receiving the received signal for detecting a level of the received signal to produce a detected level signal having a detected level;

level comparing means connected to the received signal level detecting means for comparing the detected level of the detected level signal with a predetermined threshold level to produce a level compared result signal when the detected level is greater than the predetermined threshold level;

masking means connected to the CRC bit end judging means and to the level comparing means for masking, in a predetermined time interval, the level compared result signal when the masking means is supplied with both of the CRC bit end signal and the level compared result signal, the masking means producing a trigger signal when the masking means is supplied with the level compared result signal after the predetermined time interval; and synchronizing means connected to the demodulating means and to the masking means for synchronizing the demodulated signal with the received signal by producing and supplying, in response to the trigger signal, a bit synchronous signal to the demodulating means.

According to a second aspect of this invention, there is provided a synchronizing system comprising:

demodulating means receiving a received signal for demodulating the received signal to produce a demodulated signal having a CRC bit;

CRC bit end judging means connected to the demodulating means for judging an end of the CRC bit of the demodulated signal to produce a CRC bit end signal;

received signal level detecting means receiving the received signal for detecting a level of the received signal to produce a detected level signal having a detected level;

level comparing means connected to the received signal level detecting means for comparing the detected level of the detected level signal with a predetermined threshold level to produce a level compared result signal when the detected level is greater than the predetermined threshold level;

triggering means connected to the CRC bit end judging means and to the level comparing means for producing a trigger signal when a predetermined time interval elapses when the triggering means is supplied with the level compared result signal and after the triggering means is supplied with both of the CRC bit end signal and the level compared result signal; and synchronizing means connected to the demodulating means and to the triggering means for synchronizing the demodulated signal with the received signal by producing and supplying, in response to the trigger signal, a bit synchronous signal to the demodulating means.

According to a third aspect of this invention, there is provided a synchronizing system comprising:

demodulating means receiving a received signal for demodulating the received signal to produce a demodulated signal having a CRC bit;

CRC bit end judging means connected to the demodulating means for judging an end of the CRC bit of the demodulated signal to produce a CRC bit end signal;

received signal level detecting means receiving the received signal for detecting levels of the received signal to produce a detected level signal having detected levels;

level equalizing means connected to the received signal level detecting means for equalizing the detected levels of the detected level signal to produce an equalized detected level signal having an equalized detected level which is equal to an average level of the detected levels;

level comparing means connected to the level equalizing means for comparing the equalized detected level of the equalized detected level signal with a predetermined threshold level to produce a level compared result signal when the equalized detected level is greater than the predetermined threshold level;

masking means connected to the CRC bit end judging means and to the level comparing means for masking, in a predetermined time interval, the level compared result signal when the masking means is supplied with both of the CRC bit end signal and the level compared result signal, the masking means producing a trigger signal when the masking means is supplied with the level compared result signal after the predetermined time interval; and synchronizing means connected to the demodulating means and to the masking means for synchronizing the demodulated signal with the received signal by producing and supplying, in response to the trigger signal, a bit synchronous signal to the demodulating means.

According to a fourth aspect of this invention, there is provided a synchronizing system comprising:

demodulating means receiving a received signal for demodulating the received signal to produce a demodulated signal having a CRC bit;

CRC bit end judging means connected to the demodulating means for judging an end of the CRC bit of the demodulated signal to produce a CRC bit end signal;

received signal level detecting means receiving the received signal for detecting levels of the received signal to produce a detected level signal having detected levels;

level equalizing means connected to the received signal level detecting means for equalizing the detected levels of the detected level signal to produce an equalized detected level signal having an equalized detected level which is equal to an average level of the detected levels;

level comparing means connected to the level equalizing means for comparing the equalized detected level of the equalized detected level signal with a predetermined threshold level to produce a level compared result signal when the equalized detected level is greater than the predetermined threshold level;

triggering means connected to the CRC bit end judging means and to the level comparing means for producing a trigger signal when the triggering means is supplied with the level compared result signal and when a predetermined time interval elapses after the triggering means is supplied with both of the CRC bit end signal and the level compared result signal; and synchronizing means connected to the demodulating means and to the triggering means for synchronizing the demodulated signal with the received signal by producing and supplying, in response to the trigger signal, a bit synchronous signal to the demodulating means.

DESCRIPTION OF THE PREFERRED EMBODIMENTS

Referring to FIGS. 1, 2, 3, and 4, a synchronizing system according to a first embodiment of this invention will be described in detail.

Figure 1:
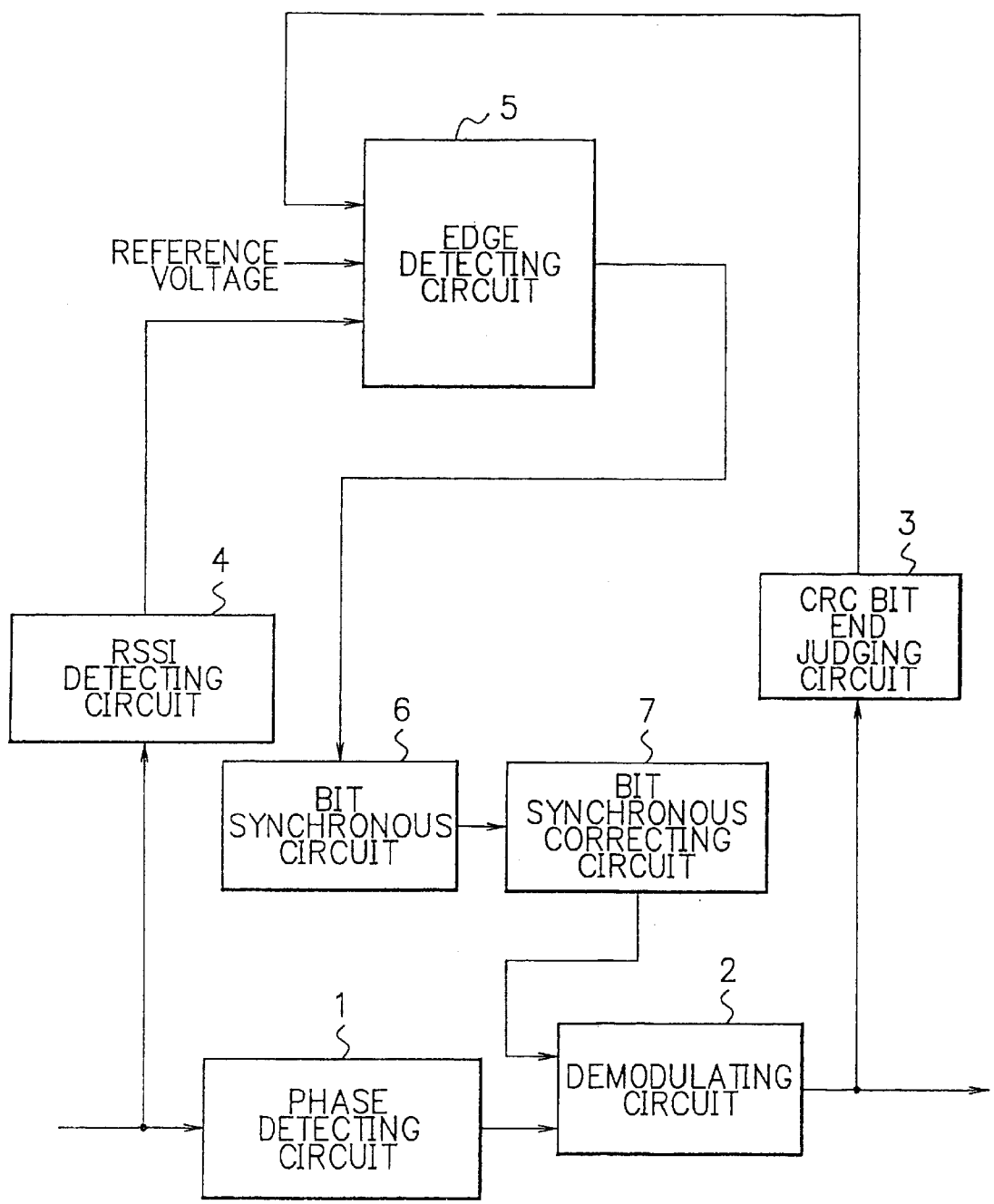
FIG. 1 is a block diagram of a synchronizing system according to a first embodiment of this invention.

In FIG. 1, the synchronizing system comprises a phase detecting circuit 1, a demodulating circuit 2, a CRC bit end judging circuit 3, a RSSI detecting circuit 4, an edge detecting circuit 5, a bit synchronous circuit 6, and a bit synchronous correcting circuit 7. The demodulating circuit 2 is connected to the phase detecting circuit 1. The CRC bit end judging circuit 3 is connected to the demodulating circuit 2. The edge detecting circuit 5 is connected to the CRC bit end judging circuit 3 and to the RSSI detecting circuit 4. The bit synchronous circuit 6 is connected to the edge detecting circuit 5. The bit synchronous correcting circuit 7 is connected to the bit synchronous circuit 6 and to the demodulating circuit 2.

The phase detecting circuit 1 receives a received signal from an antenna (not shown). The antenna is supplied with a radio signal to produce and supply the received signal to the phase detecting circuit 1. The received signal has an intermediate frequency and a CRC bit. The received signal is a phase modulated signal. The phase detecting circuit 1 detects rise of phases of the received signal to produce a phase detecting signal having the CRC bit. The phase detecting circuit 1 supplies the phase detecting signal to the demodulating circuit 2. For example, the phase detecting circuit 1 is supplied with a phase modulated signal such as QPSK, as the received signal, the phase detecting circuit 1 detects, by a phase sampling circuit, amount of change in serial bit interval to produce the phase detecting signal. The demodulating circuit 2 is supplied with the phase detecting signal. The demodulating circuit 2 demodulates, by a synchronous signal of bit rate or baud rate, the phase detecting signal to produce a demodulated signal having the CRC bit.

The CRC bit end judging circuit 3 is supplied with the demodulated signal from the demodulating circuit 2. The CRC bit end judging circuit 3 judges an end of the CRC bit of the demodulated signal to produce a CRC bit end signal. The CRC bit end judging circuit 3 detects data error of the demodulated signal.

The RSSI detecting circuit 4 receives the received signal. The RSSI detecting circuit 4 detects a level of the received signal, namely, a RSSI level, to produce a detected level signal, namely, a RSSI level signal having a detected level, namely, the RSSI level. For example, the RSSI detecting circuit 4 is implemented by a log amplifier. In this event, the RSSI detecting circuit 4 produces a RSSI voltage of an analog signal that corresponds to an envelope of a burst frame that proportions with an electric field of the received signal.

The edge detecting circuit 5 is supplied with the RSSI level signal and with the CRC bit end signal to produce an edge detecting signal, as a trigger signal. The edge detecting circuit 5 compares the RSSI level with a predetermined threshold level to produce a level compared result signal when the RSSI level is greater than the predetermined threshold level. The edge detecting circuit 5 masks, in a predetermined time interval, the level compared result signal when the edge detecting circuit 5 is supplied with both of the CRC bit end signal and the level compared result signal. Thereafter, the edge detecting circuit 5 produces the edge detecting signal, as the trigger signal, when the edge detecting circuit 5 is supplied with the level compared result signal after the predetermined time interval.

The bit synchronous circuit 6 produces, in response to the trigger signal from the edge detecting circuit 5, a bit synchronous signal having a bit synchronous phase which is synchronous to a phase of the trigger signal. The bit synchronous correcting circuit 7 is supplied with the bit synchronous signal from the bit synchronous circuit 6. The bit synchronous correcting circuit 7 corrects drift of a phase and a frequency of the bit synchronous signal to produce a bit synchronous correct signal. The bit synchronous correcting circuit 7 supplies the bit synchronous correct signal to the demodulating circuit 2. Thereby, the synchronizing system synchronizes the demodulated signal with the received signal.

Figure 2:
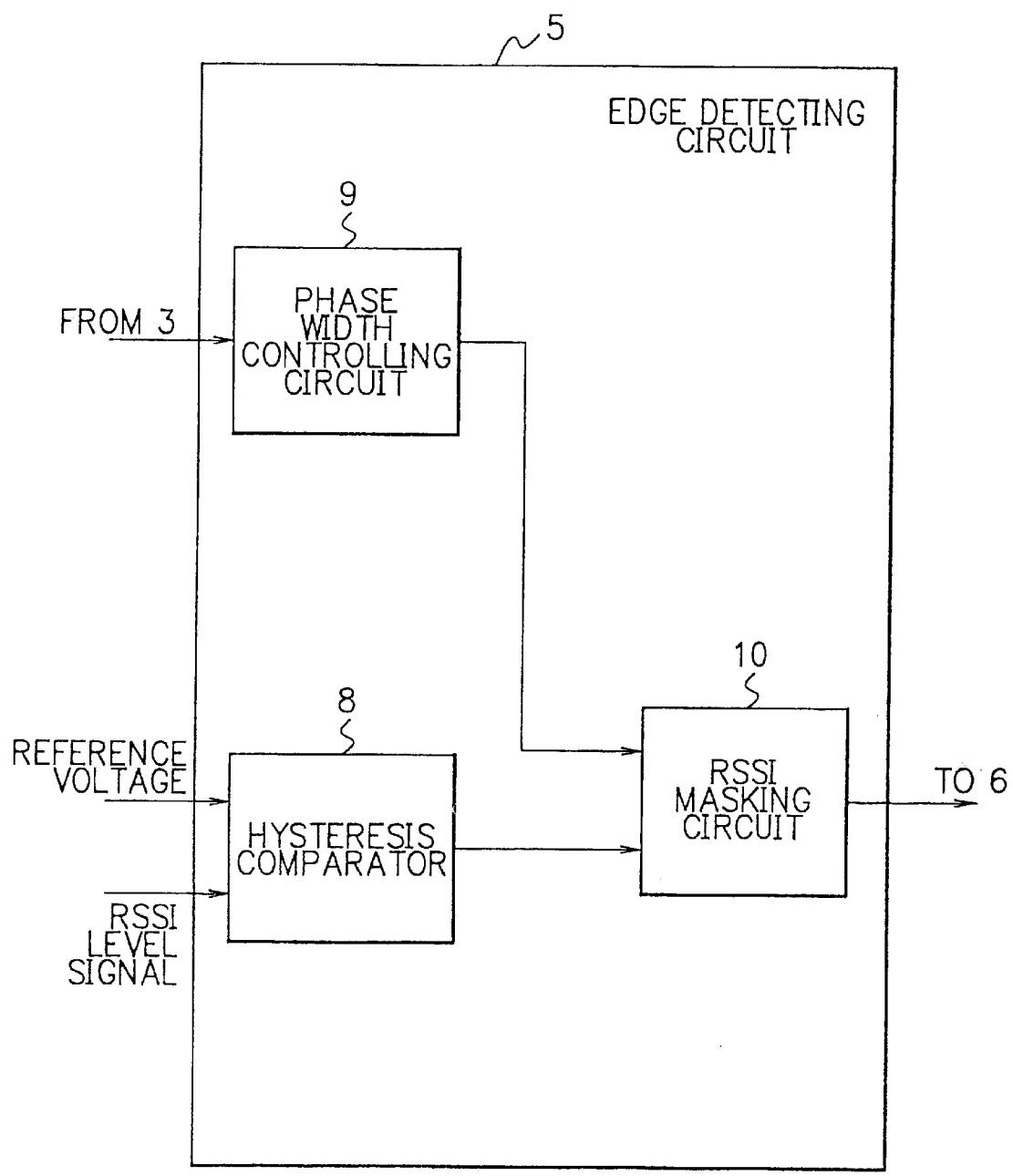
FIG. 2 is a block diagram of an edge detecting circuit of the synchronizing system illustrated in FIG. 1.

In FIG. 2, the edge detecting circuit 5 comprises a hysteresis comparator 8, a pulse width controlling circuit 9, and a RSSI masking circuit 10. The hysteresis comparator 8 is connected to the RSSI detecting circuit 4. The hysteresis comparator 8 is supplied with a reference voltage having the predetermined threshold level. The pulse width controlling circuit 9 is connected to the CRC bit end judging circuit 3. The RSSI masking circuit 10 is connected to the hysteresis comparator 8, to the pulse width controlling circuit 9, and to the bit synchronous circuit 6.

The hysteresis comparator 8 is supplied with the RSSI level signal and the reference voltage. The hysteresis comparator 8 compares the RSSI level of the RSSI level signal with the predetermined threshold level of the reference voltage to produce the level compared result signal when the RSSI level is greater than the predetermined threshold level. The pulse width controlling circuit 9 is supplied with the CRC bit end signal from the CRC bit end judging circuit 3 to produce a pulse signal having a constant time interval. When the RSSI masking circuit 10 is supplied with both of the level compared result signal and the pulse signal, the RSSI masking circuit 10 masks, in the predetermined time interval, namely, in the constant time interval of the pulse signal, the level compared result signal. Namely, the RSSI masking circuit 10 does not produce the edge detecting signal, namely, the trigger signal in the constant time interval of the pulse signal. Thereafter, the RSSI masking circuit 10 produces the edge detecting signal, namely, the trigger signal, when the RSSI masking circuit 10 is supplied with the level compared result signal after elapse of the constant time interval of the pulse signal.

Figure 3:
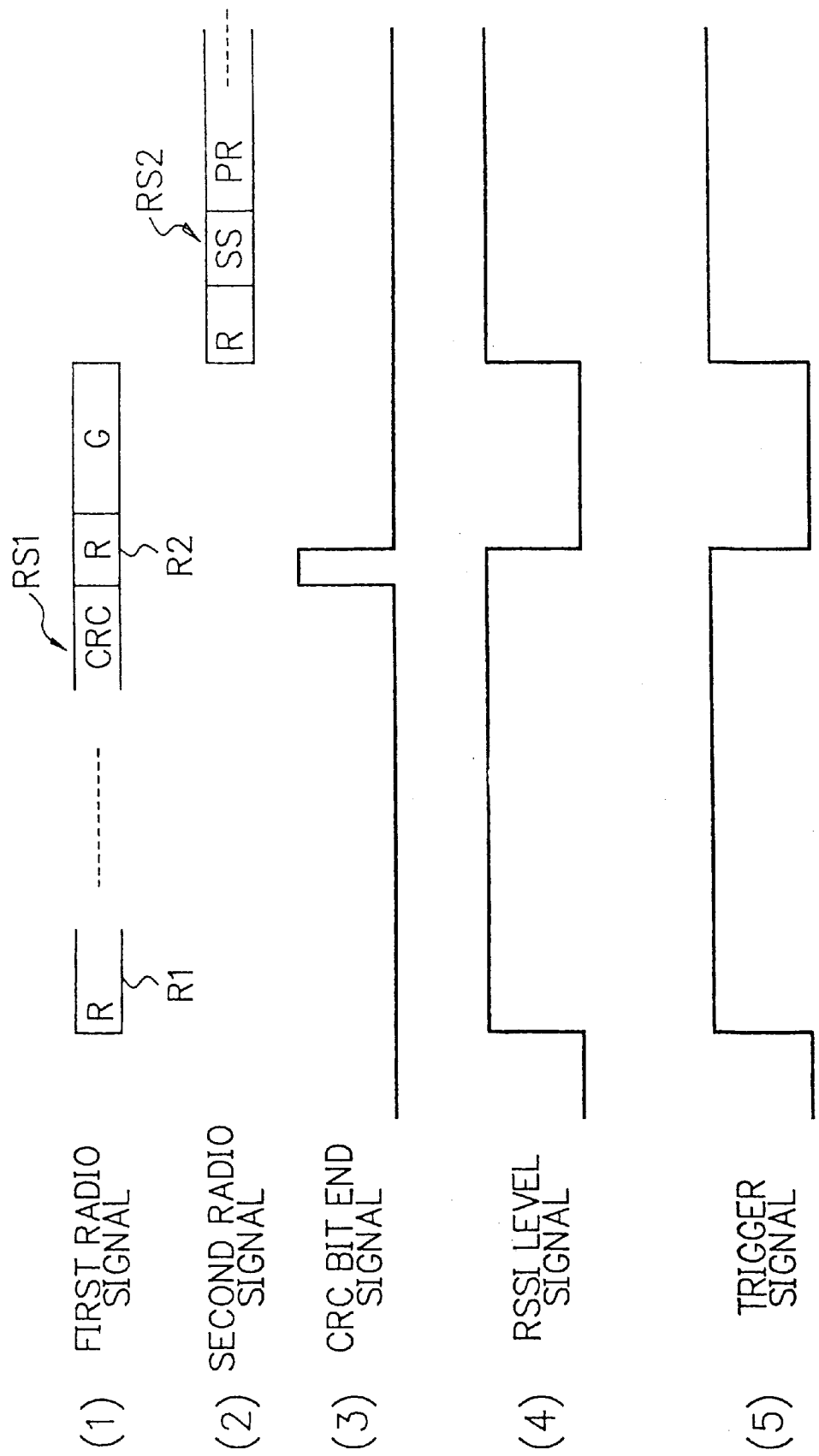
FIG. 3 is a view for use in describing an operation of the synchronizing system illustrated in FIG. 1.
Figure 4:
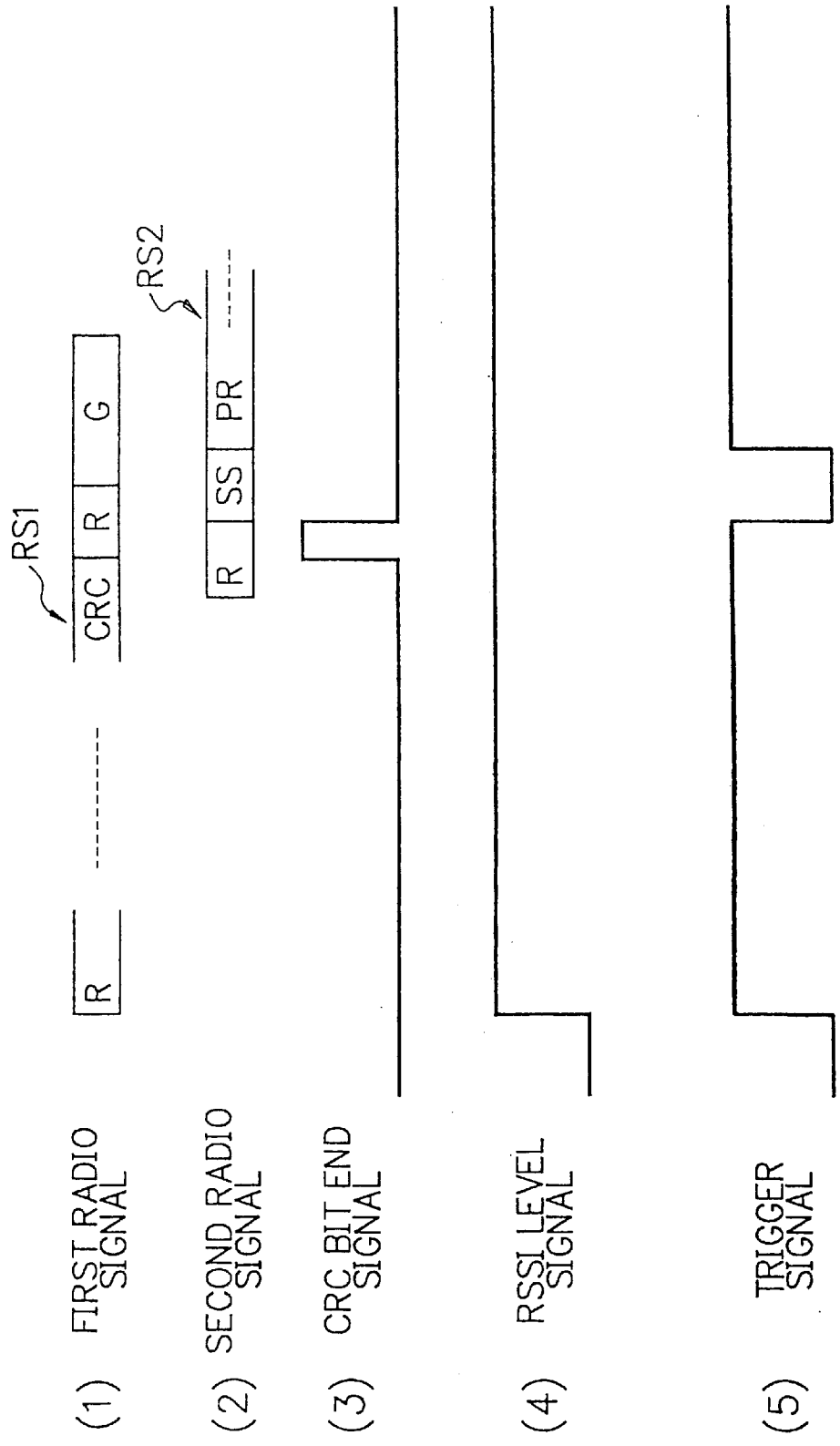
FIG. 4 is another view for use in describing the operation of the synchronizing system illustrated in FIG. 1.

Referring to FIGS. 3 and 4 together with FIGS. 1 and 2, an operation of the synchronizing system will be described.

FIG. 3 is for use in describing the operation of the synchronizing system which is supplied with first and second radio signals RS1 and RS2 which are not overlapped. Since the first and second radio signals RS1 and RS2 are not overlapped, the RSSI detecting circuit 4 produces the RSSI level signal having the RSSI level which is high from rise of a first ramp up signal R1 of the first radio signal RS1 to fall of a second ramp up signal R2 of the first radio signal RS1. Therefore, the hysteresis comparator 8 compares the RSSI level of the RSSI level signal with the predetermined threshold level of the reference voltage to produce the level compared result signal when the RSSI level is greater than the predetermined threshold level. The RSSI masking circuit 10 produces the edge detecting signal, namely, the trigger signal, when the RSSI masking circuit 10 is supplied with the level compared result signal after elapse of the constant time interval of the pulse signal. As a result, the RSSI masking circuit 10 produces the trigger signal which has a low level in the constant time interval of the pulse signal. Namely, the RSSI masking circuit 10 does not produce the trigger signal in the constant time interval of the pulse signal. Thereafter, the RSSI masking circuit 10 produces the edge detecting signal, namely, the trigger signal, after elapse of the constant time interval of the pulse signal. Since rise of the RSSI level signal corresponds to rise of each of other signals, the trigger signal can make the bit synchronous circuit 6 normally operate.

FIG. 4 is for use in describing the operation of the synchronizing system which is supplied with the first and second radio signals RS1 and RS2 which are overlapped. Since the first and second radio signals RS1 and RS2 are overlapped, the RSSI detecting circuit 4 produces the RSSI level signal having the RSSI level which is held at a high level. Therefore, the hysteresis comparator 8 compares the RSSI level of the RSSI level signal with the predetermined threshold level of the reference voltage to produce the level compared result signal because the RSSI level is greater than the predetermined threshold level. Although the RSSI detecting circuit 4 produces the RSSI level signal having the RSSI level which is held at the high level, the RSSI masking circuit 10 produces the edge detecting signal, namely, the trigger signal, when the RSSI masking circuit 10 is supplied with the level compared result signal after elapse of the constant time interval of the pulse signal. As a result, the RSSI masking circuit 10 produces the trigger signal which has a low level in the constant time interval of the pulse signal. Namely, the RSSI masking circuit 10 does not produce the trigger signal in the constant time interval of the pulse signal. Thereafter, the RSSI masking circuit 10 produces the edge detecting signal, namely, the trigger signal, after elapse of the constant time interval of the pulse signal. Therefore, in case that a time interval of overlap of the radio signals RS1 and RS2 is short and a preamble time interval of the second radio signal remains, the trigger signal can make the bit synchronous circuit 6 normally operate.

Figure 5:
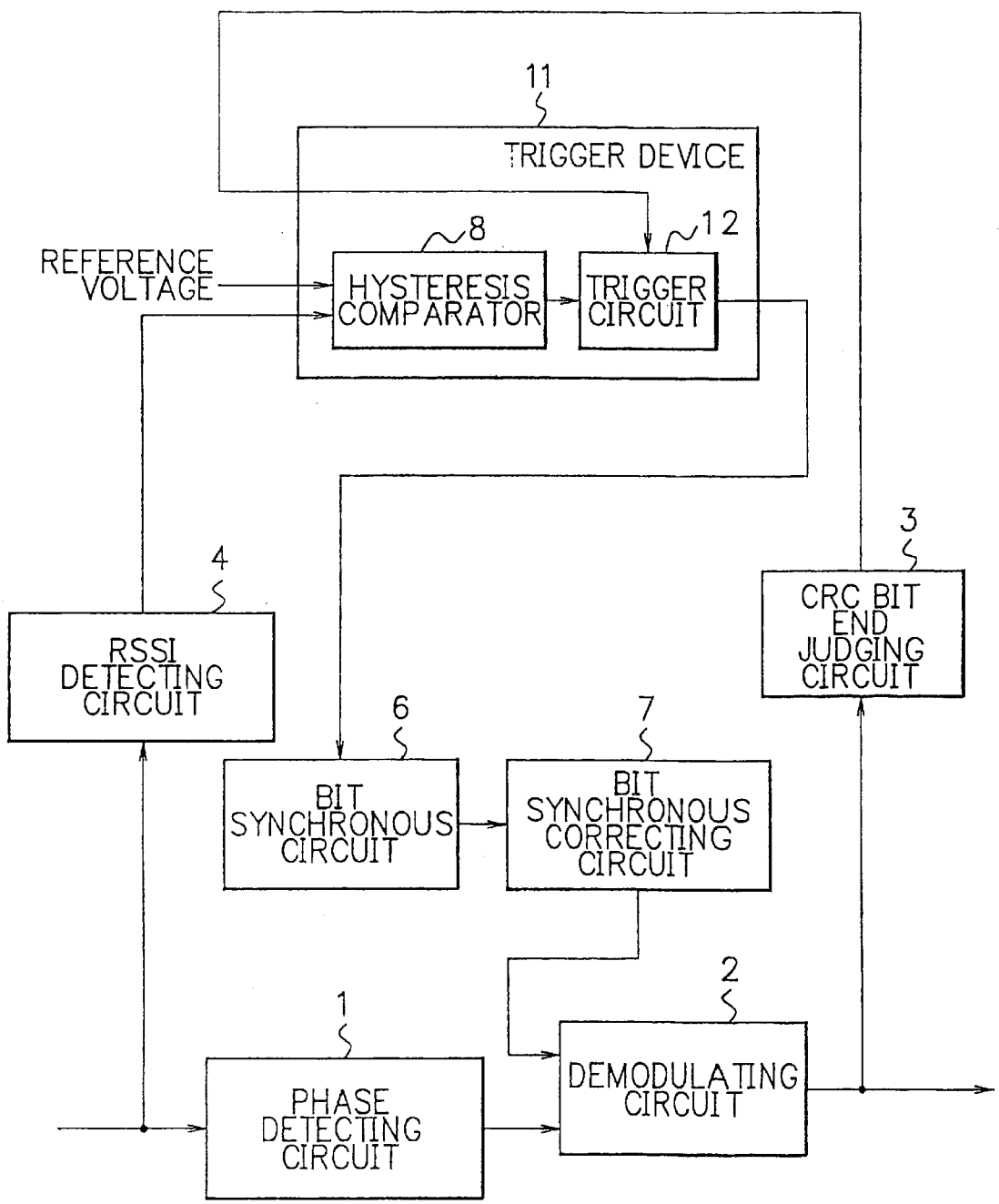
FIG. 5 is a block diagram of a synchronizing system according to a second embodiment of this invention.

Referring to FIG. 5, a synchronizing system according to a second embodiment of this invention will be described in detail. Similar parts are designated by like reference numerals.

In FIG. 5, the synchronizing system comprises the phase detecting circuit 1, the demodulating circuit 2, the CRC bit end judging circuit 3, the RSSI detecting circuit 4, the bit synchronous circuit 6, the bit synchronous correcting circuit 7, and a trigger device 11. The trigger device 11 is connected to the CRC bit end judging circuit 3 and to the RSSI detecting circuit 4. The bit synchronous circuit 6 is connected to the trigger device 11.

The trigger device 11 comprises the hysteresis comparator 8 and a trigger circuit 12. The trigger circuit 12 is connected to the hysteresis comparator 8, to the CRC bit end judging circuit 3, and to the bit synchronous circuit 6. The trigger circuit 12 produces the trigger signal when a predetermined time interval elapses when the trigger circuit 12 is supplied with the level compared result signal and after the trigger circuit 12 is supplied with both of the CRC bit end signal and the level compared result signal. The trigger circuit 12 supplies the trigger signal to the bit synchronous circuit 6.

Figure 6:
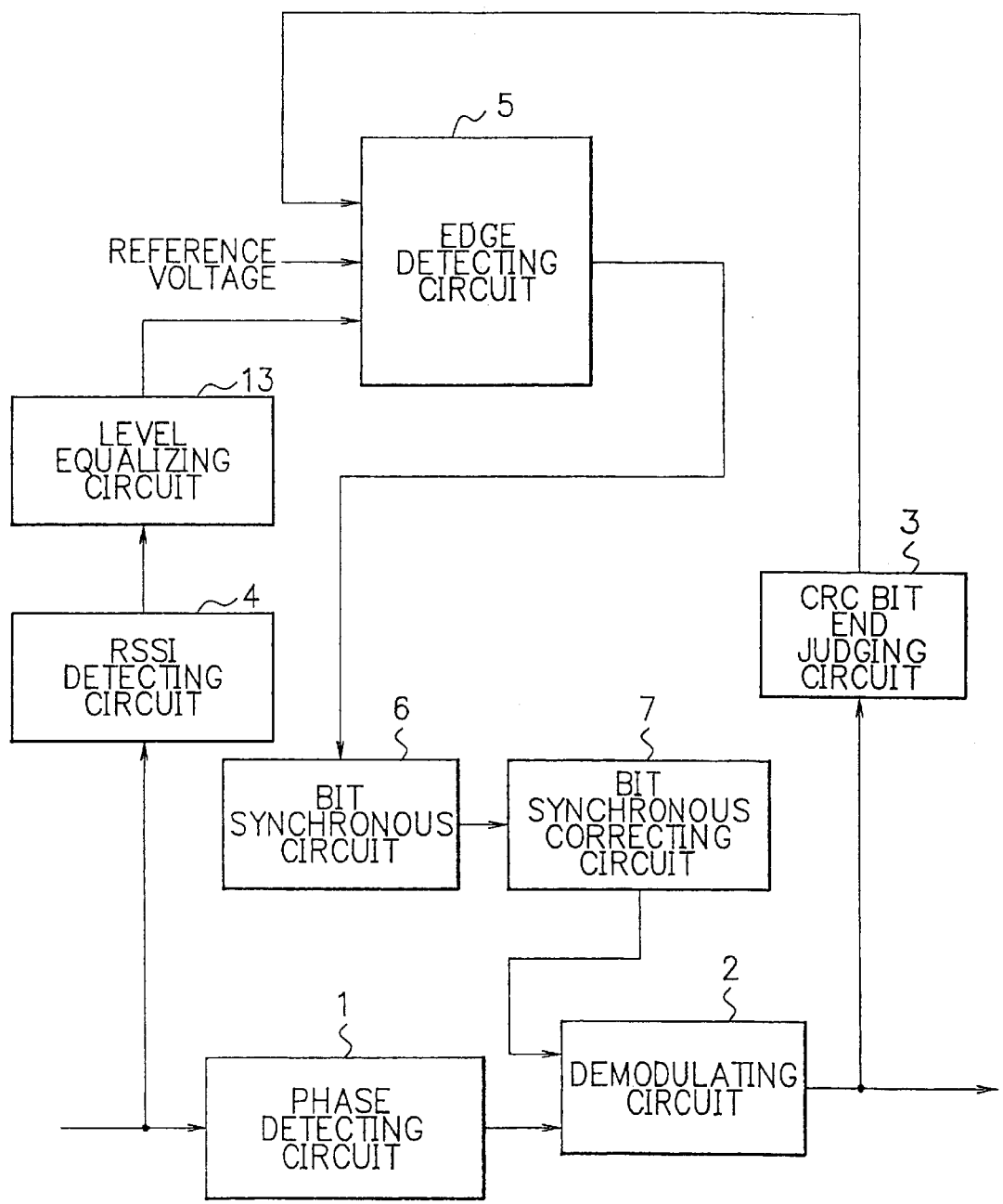
FIG. 6 is a block diagram of a synchronizing system according to a third embodiment of this invention.

Referring to FIG. 6, a synchronizing system according to a third embodiment of this invention will be described in detail. Similar parts are designated by like reference numerals.

In FIG. 6, the synchronizing system comprises the phase detecting circuit 1, the demodulating circuit 2, the CRC bit end judging circuit 3, the RSSI detecting circuit 4, the edge detecting circuit 5, the bit synchronous circuit 6, the bit synchronous correcting circuit 7, and a level equalizing circuit 13. The level equalizing circuit 13 is connected to the RSSI detecting circuit 4. The edge detecting circuit 5 is connected to the level equalizing circuit 13. The hysteresis comparator 8 of the edge detecting circuit 5 is connected to the level equalizing circuit 13.

The RSSI detecting circuit 4 detects levels, namely, RSSI levels of the received signal to produce a detected level signal, namely, a RSSI level signal having detected levels, namely, RSSI levels. The level equalizing circuit 13 is supplied with the RSSI level signal having the RSSI levels. The level equalizing circuit 13 equalizes the RSSI levels of the RSSI level signal to produce an equalized detected level signal having an equalized detected level which is equal to an average level of the RSSI levels. The level equalizing circuit 13 is implemented by a circuit which digitally samples the RSSI level signal to obtain sampling values and to equalize the sampling values. Also, The level equalizing circuit 13 may be implemented by a computing circuit or various filters and integrating circuits.

The hysteresis comparator 8 compares the equalized detected level of the equalized detected level signal with the predetermined threshold level to produce the level compared result signal when the equalized detected level is greater than the predetermined threshold level.

Figure 7:
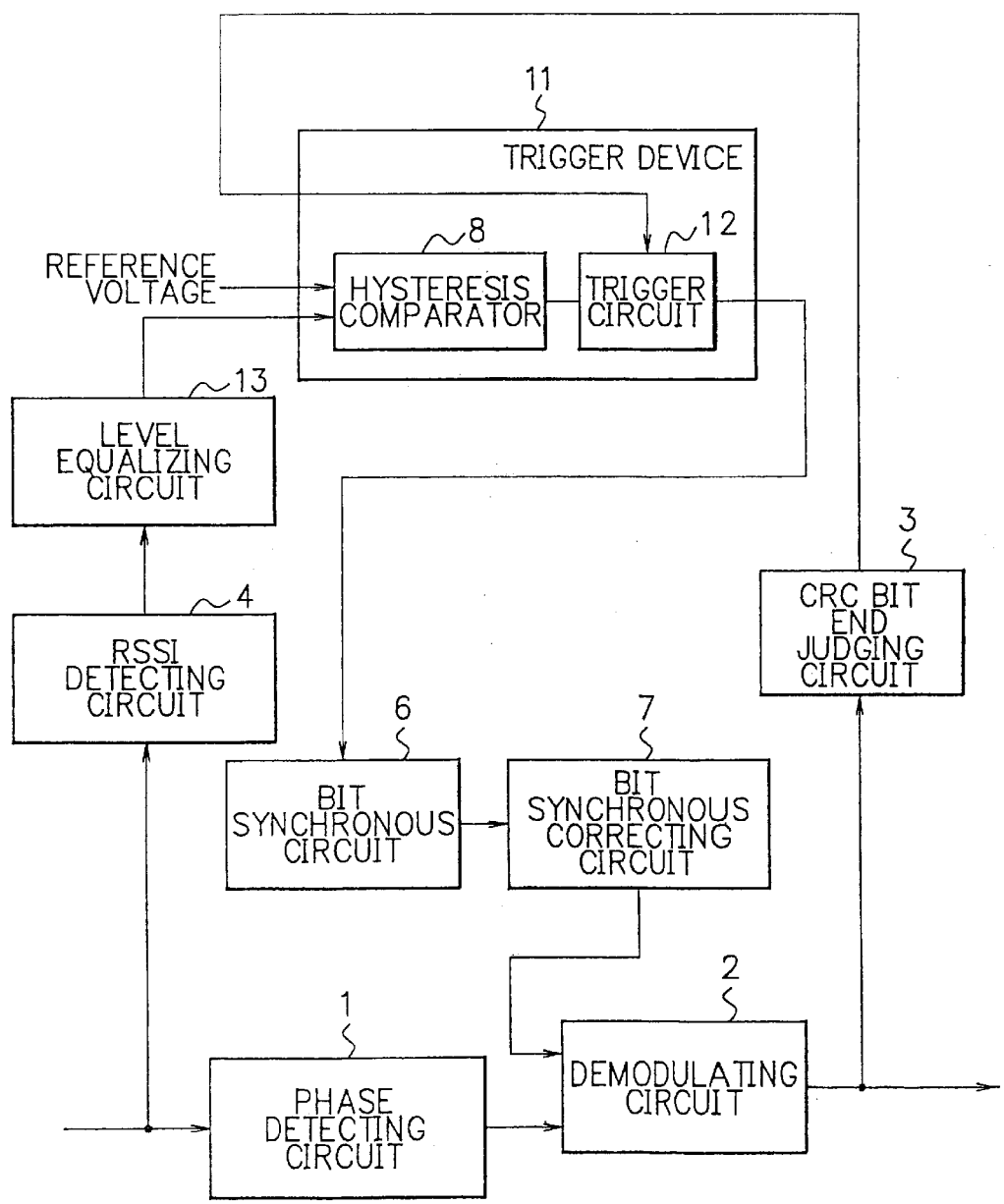
FIG. 7 is a block diagram of a synchronizing system according to a fourth embodiment of this invention.

Referring to FIG. 7, a synchronizing system according to a fourth embodiment of this invention will be described in detail. Similar parts are designated by like reference numerals.

In FIG. 7, the synchronizing system comprises the phase detecting circuit 1, the demodulating circuit 2, the CRC bit end judging circuit 3, the RSSI detecting circuit 4, the trigger device 11, the bit synchronous circuit 6, the bit synchronous correcting circuit 7, and the level equalizing circuit 13. The level equalizing circuit 13 is connected to the RSSI detecting circuit 4. The trigger device 11 is connected to the level equalizing circuit 13. The hysteresis comparator 8 of the trigger device 11 is connected to the level equalizing circuit 13.

The RSSI detecting circuit 4 detects levels, namely, RSSI levels of the received signal to produce a detected level signal, namely, a RSSI level signal having detected levels, namely, RSSI levels. The level equalizing circuit 13 is supplied with the RSSI level signal having the RSSI levels. The level equalizing circuit 13 equalizes the RSSI levels of the RSSI level signal to produce an equalized detected level signal having an equalized detected level which is equal to an average level of the RSSI levels.

The hysteresis comparator 8 compares the equalized detected level of the equalized detected level signal with the predetermined threshold level to produce the level compared result signal when the equalized detected level is greater than the predetermined threshold level.

While this invention has thus far been described in conjunction with a few preferred embodiments thereof, it will readily be possible for those skilled in the art to put this invention into practice in various other manners. For example, the synchronizing system may comprise an AFC circuit and an AFC correcting circuit instead of the bit synchronous circuit 6 and the bit synchronous correcting circuit 7.

According to this invention, it is possible to certainly execute synchronizing operation even when the synchronizing system is supplied with the radio signals which are overlapped or serial. This is because the synchronizing system can detect the rise edge of each of the received signals even when the synchronizing system is supplied with the radio signals which are overlapped or serial.

Also, according to this invention, it is possible to prevent malfunction due to change of the RSSI level. This is because, since the synchronizing system comprises the hysteresis comparator which compares the RSSI level with the predetenmined threshold level, the hysteresis comparator prevent influence of the change of the RSSI level that is caused by modulation ripple or fading.

What is claimed is:

1. A synchronizing system comprising:

demodulating means receiving a received signal for demodulating said received signal to produce a demodulated signal having a CRC bit;

CRC bit end judging means connected to said demodulating means for judging an end of said CRC bit of said demodulated signal to produce a CRC bit end signal;

received signal level detecting means receiving said received signal for detecting a level of said received signal to produce a detected level signal having a detected level;

level comparing means connected to said received signal level detecting means for comparing said detected level of said detected level signal with a predetermined threshold level to produce a level compared result signal when said detected level is greater than said predetermined threshold level;

masking means connected to said CRC bit end judging means and to said level comparing means for masking, in a predetermined time interval, said level compared result signal when said masking means is supplied with both of said CRC bit end signal and said level compared result signal, said masking means producing a trigger signal when said masking means is supplied with said level compared result signal after said predetermined time interval; and synchronizing means connected to said demodulating means and to said masking means for synchronizing said demodulated signal with said received signal by producing and supplying, in response to said trigger signal, a bit synchronous signal to said demodulating means.

2. A synchronizing system claimed in claim 1, wherein said level comparing means comprises a hysteresis comparator which is connected to said received signal level detecting means, said hysteresis comparator comparing said detected level of said detected level signal with said predetermined threshold level to produce said level compared result signal when said detected level is greater than said predetermined threshold level.

3. A synchronizing system claimed in claim 1, wherein said synchronizing means comprises:
 a bit synchronous circuit connected to said masking means for producing, in response to said trigger signal, said bit synchronous signal; and
 a bit synchronous correcting circuit connected to said bit synchronous circuit and to said demodulating means for correcting said bit synchronous signal to produce a bit synchronous correct signal and for supplying said bit synchronous correct signal, as said bit synchronous signal, to said demodulating means.

4. A synchronizing system comprising:
 demodulating means receiving a received signal for demodulating said received signal to produce a demodulated signal having a CRC bit;
 CRC bit end judging means connected to said demodulating means for judging an end of said CRC bit of said demodulated signal to produce a CRC bit end signal;
 received signal level detecting means receiving said received signal for detecting a level of said received signal to produce a detected level signal having a detected level;
 level comparing means connected to said received signal level detecting means for comparing said detected level of said detected level signal with a predetermined threshold level to produce a level compared result signal when said detected level is greater than said predetermined threshold level;
 triggering means connected to said CRC bit end judging means and to said level comparing means for producing a trigger signal when a predetermined time interval elapses when said triggering means is supplied with said level compared result signal and after said triggering means is supplied with both of said CRC bit end signal and said level compared result signal; and
 synchronizing means connected to said demodulating means and to said triggering means for synchronizing said demodulated signal with said received signal by producing and supplying, in response to said trigger signal, a bit synchronous signal to said demodulating means.

5. A synchronizing system claimed in claim 4, wherein said level comparing means comprises a hysteresis comparator which is connected to said received signal level detecting means, said hysteresis comparator comparing said detected level of said detected level signal with said predetermined threshold level to produce said level compared result signal when said detected level is greater than said predetermined threshold level.

6. A synchronizing system claimed in claim 4, wherein said synchronizing means comprises:
 a bit synchronous circuit connected to said triggering means for producing, in response to said trigger signal, said bit synchronous signal; and
 a bit synchronous correcting circuit connected to said bit synchronous circuit and to said demodulating means for correcting said bit synchronous signal to produce a bit synchronous correct signal and for supplying said bit synchronous correct signal, as said bit synchronous signal, to said demodulating means.

7. A synchronizing system comprising:
 demodulating means receiving a received signal for demodulating said received signal to produce a demodulated signal having a CRC bit;
 CRC bit end judging means connected to said demodulating means for judging an end of said CRC bit of said demodulated signal to produce a CRC bit end signal;
 received signal level detecting means receiving said received signal for detecting levels of said received signal to produce a detected level signal having detected levels;
 level equalizing means connected to said received signal level detecting means for equalizing said detected levels of said detected level signal to produce an equalized detected level signal having an equalized detected level which is equal to an average level of said detected levels;
 level comparing means connected to said level equalizing means for comparing said equalized detected level of said equalized detected level signal with a predetermined threshold level to produce a level compared result signal when said equalized detected level is greater than said predetermined threshold level;
 masking means connected to said CRC bit end judging means and to said level comparing means for masking, in a predetermined time interval, said level compared result signal when said masking means is supplied with both of said CRC bit end signal and said level compared result signal, said masking means producing a trigger signal when said masking means is supplied with said level compared result signal after said predetermined time interval; and
 synchronizing means connected to said demodulating means and to said masking means for synchronizing said demodulated signal with said received signal by producing and supplying, in response to said trigger signal, a bit synchronous signal to said demodulating means.

8. A synchronizing system claimed in claim 7, wherein said level comparing means comprises a hysteresis comparator which is connected to said level equalizing means, said hysteresis comparator comparing said equalized detected level of said equalized detected level signal with said predetermined threshold level to produce said level compared result signal when said equalized detected level is greater than said predetermined threshold level.

9. A synchronizing system claimed in claim 7, wherein said synchronizing means comprises:
 a bit synchronous circuit connected to said masking means for producing, in response to said trigger signal, said bit synchronous signal; and
 a bit synchronous correcting circuit connected to said bit synchronous circuit and to said demodulating means for correcting said bit synchronous signal to produce a bit synchronous correct signal and for supplying said bit synchronous correct signal, as said bit synchronous signal, to said demodulating means.

10. A synchronizing system comprising:
 demodulating means receiving a received signal for demodulating said received signal to produce a demodulated signal having a CRC bit;
 CRC bit end judging means connected to said demodulating means for judging an end of said CRC bit of said demodulated signal to produce a CRC bit end signal;

received signal level detecting means receiving said received signal for detecting levels of said received signal to produce a detected level signal having detected levels;

level equalizing means connected to said received signal level detecting means for equalizing said detected levels of said detected level signal to produce an equalized detected level signal having an equalized detected level which is equal to an average level of said detected levels;

level comparing means connected to said level equalizing means for comparing said equalized detected level of said equalized detected level signal with a predetermined threshold level to produce a level compared result signal when said equalized detected level is greater than said predetermined threshold level;

triggering means connected to said CRC bit end judging means and to said level comparing means for producing a trigger signal when said triggering means is supplied with said level compared result signal and when a predetermined time interval elapses after said triggering means is supplied with both of said CRC bit end signal and said level compared result signal; and synchronizing means connected to said demodulating means and to said triggering means for synchronizing said demodulated signal with said received signal by producing and supplying, in response to said trigger signal, a bit synchronous signal to said demodulating means.

11. A synchronizing system claimed in claim 10, wherein said level comparing means comprises a hysteresis comparator which is connected to said level equalizing means, said hysteresis comparator comparing said equalized detected level of said equalized detected level signal with said predetermined threshold level to produce said level compared result signal when said equalized detected level is greater than said predetermined threshold level.

12. A synchronizing system claimed in claim 10, wherein said synchronizing means comprises:

a bit synchronous circuit connected to said triggering means for producing, in response to said trigger signal, said bit synchronous signal; and a bit synchronous correcting circuit connected to said bit synchronous circuit and to said demodulating means for correcting said bit synchronous signal to produce a bit synchronous correct signal and for supplying said bit synchronous correct signal, as said bit synchronous signal, to said demodulating means.

* * * * *